(12) United States Patent
Goodrich et al.

(10) Patent No.: US 12,236,340 B2
(45) Date of Patent: Feb. 25, 2025

(54) COMPUTER-AUTOMATED ROBOT GRASP DEPTH ESTIMATION

(71) Applicant: Osaro, San Francisco, CA (US)

(72) Inventors: Ben Goodrich, San Francisco, CA (US); Alex Kuefler, London (GB); William D. Richards, San Francisco, CA (US); Christopher Correa, San Francisco, CA (US); Rishi Sharma, San Francisco, CA (US); Sulabh Kumra, San Francisco, CA (US)

(73) Assignee: Osaro, San Francisco, CA (US)

( * ) Notice: Subject to any disclaimer, the term of this patent is extended or adjusted under 35 U.S.C. 154(b) by 1087 days.

(21) Appl. No.: 17/020,565

(22) Filed: Sep. 14, 2020

(65) Prior Publication Data

US 2021/0081791 A1    Mar. 18, 2021

Related U.S. Application Data

(60) Provisional application No. 62/900,335, filed on Sep. 13, 2019.

(51) Int. Cl.
*G06N 3/08* (2023.01)
*G05B 19/4155* (2006.01)

(52) U.S. Cl.
CPC .......... *G06N 3/08* (2013.01); *G05B 19/4155* (2013.01); *G05B 2219/39271* (2013.01); *G05B 2219/40269* (2013.01)

(58) Field of Classification Search
CPC ...................................................... G06N 3/08
See application file for complete search history.

(56) References Cited

U.S. PATENT DOCUMENTS

2014/0016856 A1* 1/2014 Jiang .................. G06T 7/11
382/153
2017/0252922 A1* 9/2017 Levine .................. G06N 3/084
(Continued)

OTHER PUBLICATIONS

Goodrich, B., et al., "Depth by Poking: Learning to Estimate Depth from Self-Supervised Grasping", IEEE International Conference on Robotics and Automation (ICRA) 2020, arXiv:2006.08903v1, pp. 1-7 (Jun. 16, 2020).

(Continued)

*Primary Examiner* — Claudia Dragoescu
(74) *Attorney, Agent, or Firm* — Blueshift IP; Robert Plotkin (57) ABSTRACT

A computer system trains a neural network to predict, for each pixel in an input image, the position that a robot's end effector would reach if a grasp ("poke") were attempted at that position. Training data consists of images and end effector positions recorded while a robot attempts grasps in a pick-and-place environment. For an automated grasping policy, the approach is self-supervised, as end effector position labels may be recovered through forward kinematics, without human annotation. Although gathering such physical interaction data is expensive, it is necessary for training and routine operation of state of the art manipulation systems. Therefore, the system comes "for free" while collecting data for other tasks (e.g., grasping, pushing, placing). The system achieves significantly lower root mean squared error than traditional structured light sensors and other self-supervised deep learning methods on difficult, industry-scale jumbled bin datasets.

24 Claims, 7 Drawing Sheets

(56) References Cited

U.S. PATENT DOCUMENTS

| | | | | |
|---|---|---|---|---|
| 2018/0361586 A1* | 12/2018 | Tan | ....................... | B25J 9/1666 |
| 2020/0198148 A1* | 6/2020 | Ueno | ..................... | B25J 9/1697 |
| 2021/0174524 A1* | 6/2021 | Wang | ..................... | G06N 3/084 |

OTHER PUBLICATIONS

Viereck, U., et al., "Learning a Visuomotor Controller for Real World Robotic Grasping Using Simulated Depth Images", Proceedings of the 1st Annual Conference on Robot Learning (CoRL), pp. 1-10 (Nov. 13-15, 2017).

Morrison, D., et al., "Closing the loop for robotic grasping: A real-time, generative grasp synthesis approach," arXiv:1804.05172v2, pp. 1-10 (May 15, 2018).

Mahler, J., et al., "Dex-net 3.0: Computing robust vacuum suction grasp targets in point clouds using a new analytic model and deep learning", 2018 IEEE International Conference on Robotics and Automation (ICRA), pp. 1-8 (2018).

Geiger, A., et al., "Are we ready for autonomous driving? The KITTI vision benchmark suite", 2012 IEEE Conference on Computer Vision and Pattern Recognition, pp. 1-8 (2012).

Tatoglu, A., and Pochiraju, K., "Point cloud segmentation with lidar reflection intensity behavior", 2012 IEEE International Conference on Robotics and Automation, pp. 1-5 (2012).

Fanello, S.R., et al., "HyperDepth: Learning depth from structured light without matching", in Proceedings of the IEEE Conference on Computer Vision and Pattern Recognition, pp. 5441-5450 (2016).

Lysenkov, I., et al., "Recognition and pose estimation of rigid transparent objects with a kinect sensor", pp. 1-8 (2013).

Isola, P., et al., "Image-to-image translation with conditional adversarial networks," in Proceedings of the IEEE Conference on Computer Vision and Pattern Recognition, arXiv:1611.07004v3, pp. 1-17 (2018).

Kendall, A., et al., "End-to-end learning of geometry and context for deep stereo regression," in Proceedings of the IEEE International Conference on Computer Vision, pp. 66-75 (2017).

Smolyanskiy, N., et al., "On the importance of stereo for accurate depth estimation: An efficient semi-supervised deep neural network approach," in Proceedings of the IEEE Conference on Computer Vision and Pattern Recognition Workshops, pp. 1120-1128 (Jun. 18-22, 2018).

Geiger, A., et al., "Efficient large-scale stereo matching", Computer Science, vol. 6492, pp. 1-14 (2011).

Jang, E., et al., "Grasp2vec: Learning object representations from self-supervised grasping", 2nd Conference on Robot Learning, arXiv:1811.06964v2, pp. 1-14 (2018).

Kalashnikov, D., et al., "Scalable deep reinforcement learning for vision-based robotic manipulation", 2nd Conference on Robot Learning (CoRL 2018), vol. 87, pp. 1-23 (2018).

Pathak, D., et al., "Zero-shot visual imitation, in Proceedings of the IEEE Conference on Computer Vision and Pattern Recognition Workshops", pp. 1-16 (2018).

Ebert, F., et al., "Self-supervised visual planning with temporal skip connections", 2nd Conference on Robot Learning (CoRL), arXiv:1710.05268v1, pp. 1-13 (2017).

Ebert, F., et al., "Robustness via retrying: Closed-loop robotic manipulation with self-supervised learning", 2nd Conference on Robot Learning (CoRL), arXiv:1710.05268v1, pp. 1-12 (2018).

Pinto, L., and Gupta, A., et al., "Supersizing self-supervision: Learning to grasp from 50k tries and 700 robot hours", 2016 IEEE International Conference on Robotics and Automation (ICRA), pp. 1-8 (2015).

Agrawali, P., et al., "Learning to poke by poking: Experiential learning of intuitive physics", arXiv:1606.07419v2, pp. 1-10 (Feb. 15, 2017).

Kahn, G., et al., "Uncertainty-aware reinforcement learning for collision avoidance," arXiv:1702.01182v1, pp. 1-12 (Feb. 3, 2017).

Kendall, A., et al., "What uncertainties do we need in Bayesian deep learning for computer vision?", Advances in Neural Information Processing Systems 30 (NIPS 2017) pp. 1-11 (2017).

Kendall, A., et al., "Multi-task learning using uncertainty to weigh losses for scene geometry and semantics", Computer Vision and Pattern Recognition, arXiv:1705.07115v3, pp. 1-14 (Apr. 24, 2018).

Long, J., et al., "Fully convolutional networks for semantic segmentation", Proceedings of the IEEE Conference on Computer Vision and Pattern Recognition (CVPR), arXiv:1411.4038v2, pp. 1-10 (Mar. 8, 2015).

Lin, T., et al., "Feature pyramid networks for object detection", Proceedings of the IEEE Conference on Computer Vision and Pattern Recognition (CVPR), pp. 2117-2125 (2017).

Kaiming, H., et al., "Deep residual learning for image recognition", 2016 IEEE Conference on Computer Vision and Pattern Recognition (CVPR), pp. 770-778 (2016).

Lin, T., et al., "Microsoft COCO: Common objects in context", Computer Vision and Pattern Recognition, arXiv:1405.0312v3, pp. 1-15 (Feb. 21, 2015).

Bishop, C. M., et al., "Mixture density networks", Mixture density networks, Technical Report, pp. 1-26 (Feb. 1994).

Saxe, A. M., et al., "On random weights and unsupervised feature learning", in Proceedings of the 28th International Conference on International Conference on Machine Learning, vol. 2, No. 3, pp. 1-9 (2011).

Cook, R.D., and Weisberg, S., "Residuals and influence in regression," New York: Chapman and Hall, pp. 1-240 (1982).

Yang, S.W., and Wang, C., "On solving mirror reflection in LIDAR sensing", IEEE/ASME Transactions on Mechatronics, vol. 16, No. 2, pp. 255-265 (2011) (Abstract).

* cited by examiner

COMPUTER-AUTOMATED ROBOT GRASP DEPTH ESTIMATION

BACKGROUND

Accurate depth estimation remains an open problem for robotic manipulation. Even state of the art techniques, such as structured light sensors, fail on reflective or transparent surfaces.

What is needed, therefore, are improved techniques for performing depth estimation in connection with robotic manipulation.

SUMMARY

A computer system trains a neural network to predict, for each pixel in an input image, the position that a robot's end effector would reach if a grasp ("poke") were attempted at that position. Training data consists of images and end effector positions recorded while a robot attempts grasps in a pick-and-place environment. For an automated grasping policy, the approach is self-supervised, as end effector position labels may be recovered through forward kinematics, without human annotation. Although gathering such physical interaction data is expensive, it is necessary for training and routine operation of state of the art manipulation systems. Therefore, the system comes "for free" while collecting data for other tasks (e.g., grasping, pushing, placing). The system achieves significantly lower root mean squared error than traditional structured light sensors and other self-supervised deep learning methods on difficult, industry-scale jumbled bin datasets.

DETAILED DESCRIPTION

A computer system trains a neural network to predict, for each pixel in an input image representing a live three-dimensional environment, the position that a robot's end effector would reach in that live three-dimensional environment if the robot's end effector were to attempt a grasp ("poke") at that position. Training data may, for example, include: (1) images representing a three-dimensional pick-and-place environment; and (2) end effector positions recorded while a robot attempts grasps in the pick-and-place environment. For an automated grasping policy, embodiments of the approach disclosed herein may be self-supervised, as end effector position labels may be recovered through forward kinematics, without human annotation. Although gathering such physical interaction data is expensive, it is necessary for training and routine operation of state of the art manipulation systems. Therefore, embodiments of the depth estimator disclosed herein come "for free" while collecting data for other tasks (e.g., grasping, pushing, placing). Embodiments of the present invention may achieve significantly lower root mean squared error than traditional structured light sensors and other self-supervised deep learning methods on difficult, industry-scale jumbled bin datasets.

Estimating the distance of objects to a given viewpoint is a long-standing problem in computer vision with implications for robotics. In the context of learning-based robot grasping and manipulation, reliable depth estimates are important at both training and inference time. During training, depth maps provide information about a visual scene that is invariant to color. Data augmentation can also impose model invariance to nuisance features, but depth imagery provides additional information useful for robotic manipulation. During inference, knowing the depth of candidate grasp or placement points allows a gripper to navigate into position quickly, without relying on sensorimotor feedback.

Depth maps are often obtained with specialized hardware. Due to their commercial availability and ease of use, structured light sensors are particularly popular for robotics. Light detection and ranging (LiDAR) is also common for autonomous driving, as structured light approaches encounter difficulty in outdoor settings. Both approaches suffer from sensor noise, particularly when encountering shiny, reflective, transparent, or textureless surfaces. In large-scale pick and place contexts (e.g., e-commerce, automated warehousing) the type of items to be manipulated can be diverse, unpredictable, or in some cases, entirely unknown a priori. Therefore it is important that depth estimation approaches generalize to a wide range of surfaces.

Embodiments of the present invention are directed to a variety of techniques which are referred to herein generally as "Depth-by-Poking (DbP)." More specifically, embodiments of the present invention include a depth estimation technique for robotic grasping that may be trained using only self-supervised learning. A robot is placed in a three-dimensional environment (also referred to herein as a "pick-and-place setting"), examples of which are disclosed herein. The environment may include one or a plurality of objects. The robot may include one or a plurality of arms. Each of the plurality of arms may include a corresponding effector, e.g., at the end of the arm. As this implies, the robot may include a plurality of arms having a corresponding plurality of effectors. Each arm and each effector may take any of a variety of forms, some of which are disclosed herein. Embodiments of the present invention are not limited to use with any particular type of robot, arm, or effector. The robot may include arms of different types and/or effectors of different types.

The system may control a particular one of the arms of the robot to cause the particular one of the arms to use the arm's effector to attempt to grasp, using the arm's effector, one of the objects in the environment. The grasp attempt may, for example, be an attempt to grasp a particular intended object in the environment, or an attempt to grasp any object in the environment (e.g., a grasp attempt that does not target any particular object in the environment). The system may, for example, select a point in the image, such as a point that is determined to likely be a successful grasp point, and then control the robot arm to make a grasp attempt that targets the selected point from the image in the environment, such as by moving the robot arm's end effector in a ray-traced path from the camera toward a point in the environment that corresponds to the selected point from the image.

Regardless of how the grasp point is selected or the grasp is performed, the system determines whether the attempted grasp was successful, such as by using any of a variety of known techniques. For example, if the effector is suction-based, then the system may determine whether the attempted grasp was successful by measuring output of a suction sensor on or coupled to the effector. If force is felt but no suction is detected, then the system may conclude that the grasp attempt failed; if force is felt and suction is detected, then the system may conclude that the grasp attempt succeeded. These are merely examples, however, and not limitations of the present invention.

Furthermore, and as will be described in more detail below, the system need not measure the success of the grasp attempt, and training may be performed without any such measures of success.

Furthermore, picking is not necessary. For example, a blunt stick "poking" object may be attached to the end of the robot arm, which may then be pressed on points identified from an image, by moving the arm in a ray-traced path from the camera toward a point, and then measuring force detected at or from the poking object. When sufficient force is detected, pose may be measured and recorded at that point, as disclosed elsewhere herein, without necessarily recording any measure of grasp success.

The system may use a camera or other image capture device to capture and store a two-dimensional image of the three-dimensional environment (including, e.g., the robot arm with its corresponding effector at the point of the attempted grasp (i.e., the "grasp point") and the object which was attempted to be grasped).

Embodiments of the present invention may identify and generate and store data representing, for each such attempted grasp (each of which may succeed or fail), either: (1) robot pose (i.e., the location of the end effector in either two or three dimensions and also its orientation); or (2) both robot pose and grasp success. As will be described in more detail below, embodiments of the present invention use either the identified robot pose or robot pose and grasp success as training labels. Such data are not available in general computer vision settings, but are readily obtained by embodiments of the present invention in pick-and-place settings. Embodiments of the present invention may formulate depth estimation as an image-to-image translation problem, wherein RGB or noisy depth images are translated into accurate depth maps by a deep fully-convolutional network (FCN). Models used by embodiments of the present invention may, for example, be trained to produce depth maps by performing per-pixel regression where the robot effector's pose during a grasp provides a training label. In this setting data may be sparsely labeled, as only a single pixel (the grasp point) per training image has a ground truth depth value. But, as described herein, embodiments of the present invention generalize over complete depth maps, given enough training data. Furthermore, the burden of data collection may be small in the context of existing, self-supervised grasping approaches.

The system may make any number of repeated grasp attempts in the environment and repeat the steps above for each such grasp attempt. For example, for each of the plurality of grasp attempts, the system may, using any techniques disclosed herein, perform any one or more of the following operations, in any combination:

determine whether the grasp attempt was successful, and generate and store data indicating whether the grasp attempt was successful;

capture and store an image of the three-dimensional environment at the time of the grasp attempt; and obtain and store data representing robot pose (i.e., the location of the robot arm's end effector in either two or three dimensions and also its orientation) at the time of the grasp attempt (e.g., when the robot arm's end effector is at the grasp point).

The plurality of grasp attempts may include, for example, any one or more of the following, in any combination:

One or a plurality of grasp attempts made by a single one of the robot arms (and corresponding effectors) on the robot.

A first plurality of grasp attempts made by a first one of the robot arms (and corresponding first effector) on the robot, and a second plurality of grasp attempts made by a second one of the robot arms (and corresponding second effector) on the robot.

Figure 1A:
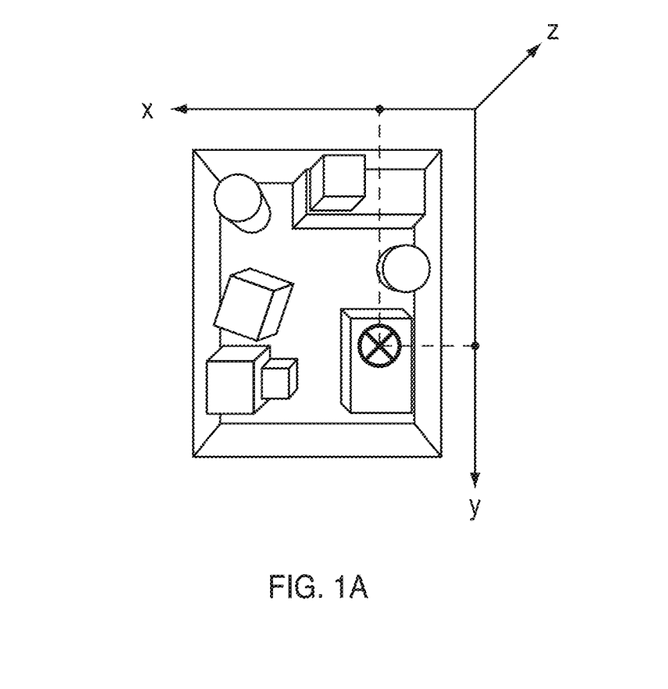
FIG. 1A is an illustration of a pick-and-place environment for use with various embodiments of the present invention.
Figure 1B:
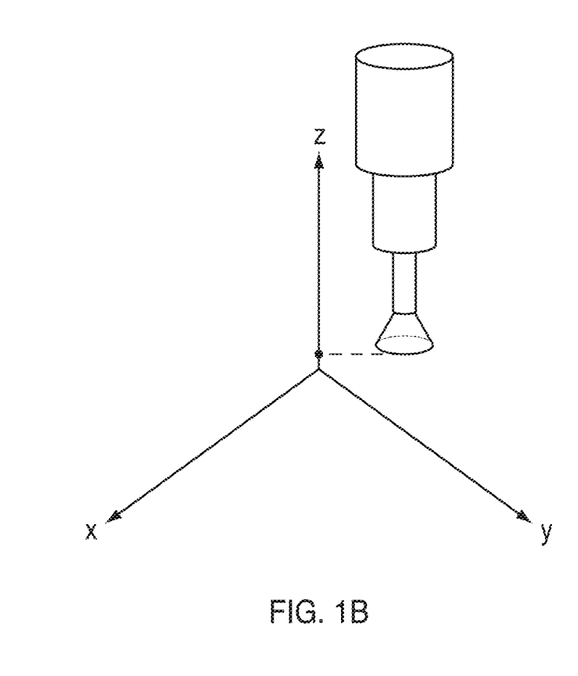
FIG. 1B is an illustration of a robot arm, including an end effector, for use with various embodiments of the present invention.
Figure 2:
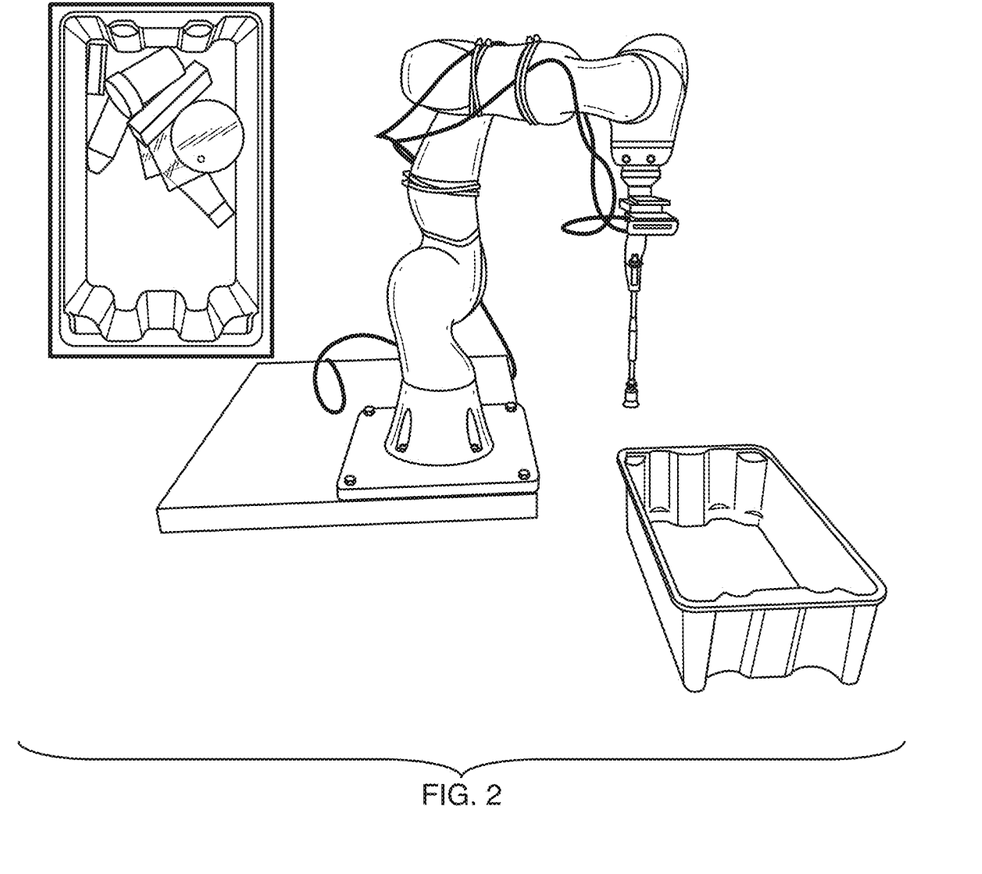
FIG. 2 is a side view of a robot including a robot arm for use with various embodiments of the present invention.

In general, and as shown in FIGS. 1A and 1B, in embodiments of the present invention, training data may be gathered by attempting picks. Note that "grasp" refers to holding an object (e.g., with suction), and that "pick" refers to retrieving an object. Any reference herein to a "grasp" should be understood to apply equally to a "pick" and vice versa. Collected samples may include, for example: (a) top-down images of a cluttered bin and a grasp point projected into pixel coordinates (illustrated by a black "x" in FIG. 1A) and (b) label position of the robot end effector along the z-axis. FIG. 1B shows a robot arm (including an end effector) and illustrates that the robot arm is positioned to move the end effector into the environment along the z (depth) axis.

Advantageous features of embodiments of the present invention, include, for example:

A new self-supervised depth estimation approach for robotic manipulation, which generalizes to challenging surfaces and can quantify prediction uncertainty.

Evaluation of the model disclosed herein across multiple robots and items representative of real-world, industrial pick and place problems.

The ability to work even with reflective or transparent surfaces. Models generated and used by embodiments of the present invention learn depth from measuring physical contact forces (i.e., by interacting with the environment), and therefore can recognize when a surface is reflective or transparent, provided that they have been trained on such surfaces. For example, embodiments of the present invention may recognize a transparent glass jar as a glass jar and correctly estimate its surface depth, even though such a jar would be invisible to a structured light sensor.

Some related work includes, but is not limited to, the following:

Depth Estimation. There is large body of work on estimating the distance of objects to a given viewpoint. Current state of the art approaches combine stereo vision and deep learning by computing disparities between learned feature maps rather than raw pixels. In particular, domain knowledge may be used to formulate a novel, differentiable "soft argmin" layer for regressing sub-pixel disparity values. This work has been extended by combining the standard disparity loss with an unsupervised learning term, as well as introducing a new learnable argmax operation. Despite achieving state of the art results on the KITTI autonomous driving benchmark, deep stereo methods are still limited by their reliance on ground truth training data derived from LiDAR sensors, which can require careful, manual calibration and produce inaccurate labels on some surfaces.

Self-Supervised Learning. Recent work at the intersection of robotics and machine learning leverages robot autonomy during data collection. Sources of self-supervision are particularly rich in the robotic manipulation problems that are the focus of the techniques disclosed herein. For instance, detecting the success of a grasp attempt can be automated using pressure feedback for suction effectors, or side cameras or background subtraction schemes in the case of fingered grippers. Observation sequences have also be used to learn video prediction tasks in both mobile and stationary robot settings. Although learning from interacting with a physical environment can be data intensive, self-supervised learning is attractive when data collected for one purpose (e.g., grasping) can be re purposed for another (e.g., video prediction). In this sense, self-supervised can come for free with other robotics tasks, despite its high sample complexity.

Image-to-Image Translation. Many vision tasks such as semantic segmentation, depth estimation, inpainting, and robotic grasping work by translating one or more input images into an output image of equal spatial dimensions. Such tasks are difficult as they require per-pixel predictions making model outputs high dimensional. FCNs mitigate this computational expense by learning low dimensional features without fully-connected layers, allowing more parameters to be shared at every layer of the network. State of the art models typically use a ResNet "backbone", while remaining fully convolutional.

Uncertainty Aware Deep Learning. One reason probabilistic models are attractive is that they produce estimates of uncertainty in addition to predictions. In a robotics context uncertainty estimates can enable safe decision making. Some existing systems make a distinction between model uncertainty and aleatoric uncertainty, the latter of which results from inherent noise in the data. Modeling aleatoric uncertainty is particularly useful for depth estimation, where sensor noise is prevalent.

Embodiments of the present invention disclosed herein advantageously use tactile interactions (e.g., grasps or "pokes") with the environment to perform depth estimation. Embodiments disclosed herein are formulated as an image-to-image translation problem and thus make use of common architectures from the literature referenced above. Because embodiments of the present invention disclosed herein are intended for real world pick and place problems, those embodiments additionally make use of uncertainty estimation to prevent depth predictions that might result in collisions.

Having described certain embodiments of the present invention at a high level of generality, certain embodiments of the present invention will now be described in more detail.

Embodiments of the present invention assume a dataset consisting of tuples (I,D,g,y,z) gathered through physical interaction with an environment. Here $I \in \mathbb{R}^{h \times w \times 3}$ is an RGB image and $D \in \mathbb{R}^{h \times w}$ is an aligned depth image sampled from a noisy sensor. The aligned depth image may, for example, be generated using any of a variety of well-known techniques, such as by using one or more structured light sensors (SLS) to project dot patterns in infrared and then measuring, using an infrared camera, deformations in the projected dot patterns on one or more surfaces in the environment. In some embodiments of the present invention, an Intel RealSense D415 structured light sensor is used for this purpose. This depth image can be viewed as an estimate of $Z \in \mathbb{R}^{h \times w}$, whose values correspond to the actual, ground truth depth at each pixel in I. An aligned depth image may, for example, be an image which contains a plurality of pixels having: (1) a plurality of pixel values, and (2) a plurality of depth values. The depth value at location x,y may represent the depth of the position in the three-dimensional environment represented by the pixel at location x,y.

Embodiments of the present invention may use any of the techniques disclosed herein to capture an image I and a corresponding aligned depth image D of the environment while the robot arm is not in the scene. Then, each time the robot arm attempts to grasp an object in the environment, embodiments of the present invention may capture at least one additional image I and at least one corresponding aligned depth image D of the environment, such as when the robot arm's end effector is at the grasp point. In this way, embodiments of the present invention may generate a plurality of two-dimensional images I and corresponding aligned depth images D. An aligned depth image D is said to "correspond" to an image I when both the image I and the aligned depth image D were captured from the same environment, e.g., at the same or substantially the same time as each other, such as at the time of a particular grasp attempt.

Embodiments of the present invention produce an estimate $\hat{Z}$ of Z given I and D. Gathering even a small sample of ground truth depth images is prohibitive for large-scale applications. However, routine data collection and operation produces many single-pixel samples of Z, as forward kinematics can recover the end effector's position along the vertical axis while attempting a grasp. These scalar samples z are recorded at a point g in the image where suction is first achieved or a force threshold is met (for failed grasps). Using camera intrinsic and extrinsic parameters, it is straightforward to map g between world and camera frame. Embodiments of the present invention use g to refer to a single pixel of the image I. Binary grasp success labels y are also easy to produce in a self-supervised fashion, by relying on suction feedback after a pick attempt.

Given a dataset of attempted picks, embodiments of the present invention learn $\hat{Z}$ by learning estimates $\hat{z}$ at individual pixels g where picks were attempted. In other words, embodiments of the present invention formulate depth estimation as a regression problem, which includes minimizing the distance between z and $\hat{z}$. The labels y may (but need not) also be used as auxiliary information in our loss.

One advantage of the depth by poking approach of embodiments of the present invention is that training data come for free during standard data collection or inference of other grasping methods. No reinforcement learning or human labeling is required, assuming that y can be automatically generated. This assumption is typical for setups using suction effectors (where pressure feedback indicates a successful grasp) and past work has developed automatic labeling schemes for other effector types.

A challenge posed by embodiments of the present invention is that our data may be sparsely labeled. Only a single grasp pixel g provides gradient signal for an entire training tuple. Multiple grasps or pokes may be attempted per image, but doing so would likely disturb the scene. However, we validate empirically that even training on single-pixel depth samples per image is sufficient to generalize to unseen data.

Having described certain embodiments of the present invention in more detail, examples of an environment setup that was used in connection with embodiments of the present invention will now be described.

Data were collected using a Kuka LBR iiwa 14 R820 fitted with a 34 mm wide suction tooltip (which is an example of an "end effector," as that term is used herein). An Intel RealSense camera mounted directly over the picking bin gathered images I and D in all three environments. We sampled these images at resolutions between 320 and 512 pixels in height and width in all experiments. Each arm followed a randomized policy, but the approach disclosed herein is general enough to work with a number of popular grasping methods, such as QT-Opt or DexNet.

Figure 3A:
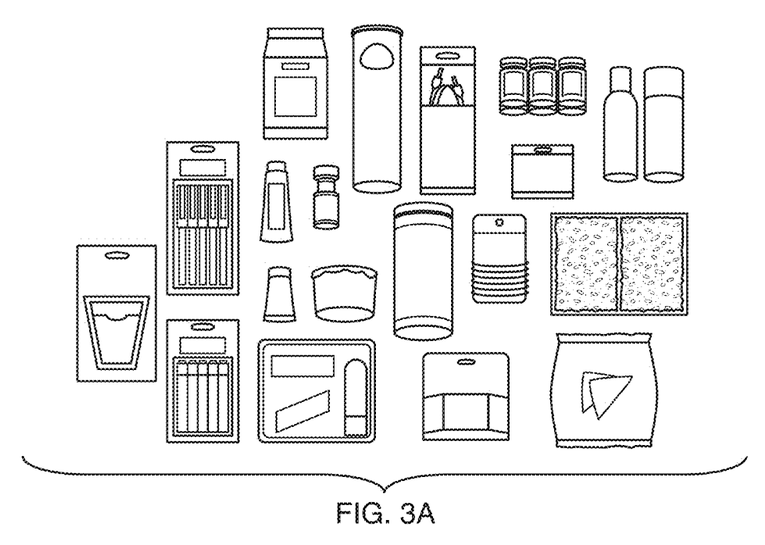
FIGS. 3A and 3B show various objects suitable for use with various embodiments of the present invention.
Figure 3B:
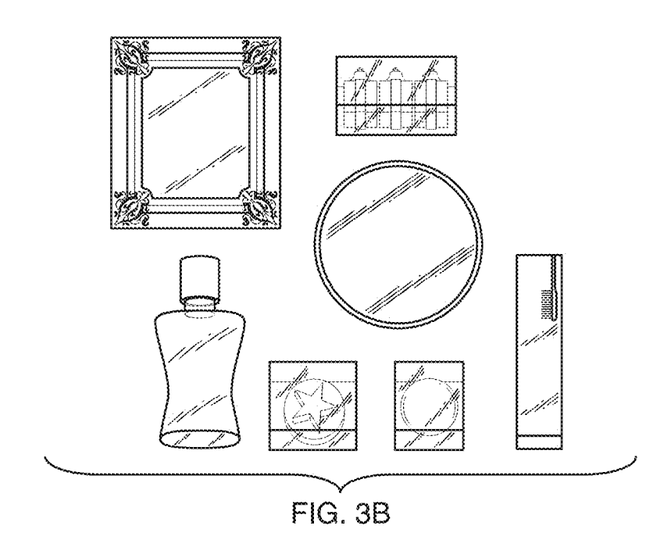

Robots attempted grasps on well over 100 unique objects representative of stock keeping units (SKU) encountered in real world environments. This object set included, but was not limited to regular boxes, items with reflective or transparent surfaces, clamshells, and aerosol bottles. A sample of SKUs used in our experiments is shown in FIGS. 3A and 3B. More specifically, FIG. 3A shows example objects used in the experiments disclosed herein, such as boxes, bottles, aerosels, clamshells, and other objects common in retail fulfillment and e-commerce tasks. FIG. 3B shows example adversarial objects known to be especially difficult for structured light sensors, such as shiny, transparent, or reflective objects.

Certain embodiments of the present invention may formulate depth estimation as an image-to-image translation problem, where a model with parameters θ maps input images I and D to an output image Z. FCNs work well in this setting, as they preserve the spatial layout of image data while transforming input to output through a series of convolution, pooling, and elementwise nonlinear operations.

Figure 4:
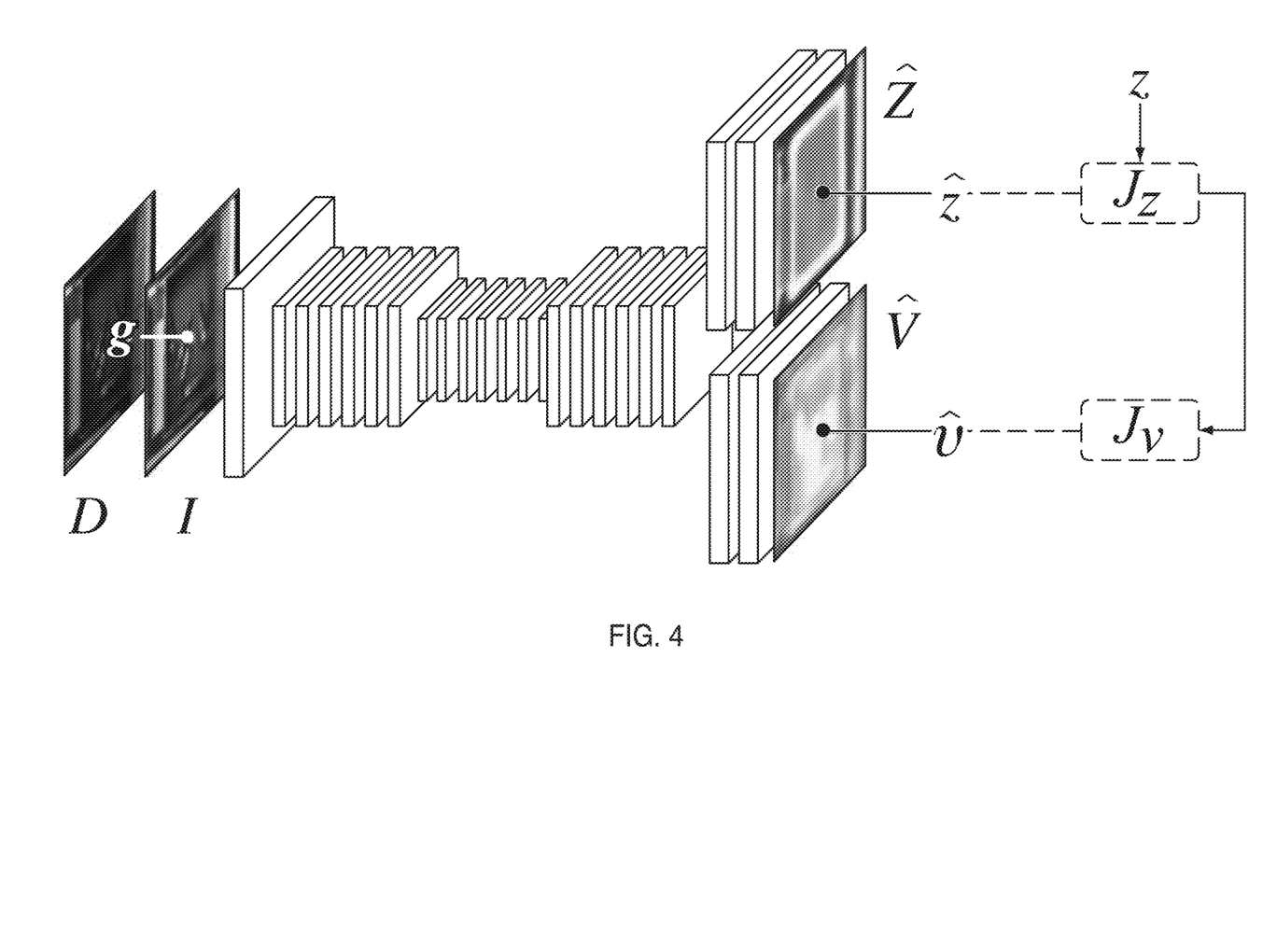
FIG. 4 illustrates an encoder-decoder architecture with disjoint encoders for 1 and D inputs in accordance with various embodiments of the present invention.

In our experiments we represent Depth by Poking with a FCN having an encoder-decoder architecture with disjoint encoders for the I and D inputs shown in FIG. 4. The encoders are implemented as feature pyramidal networks (FPN) with a ResNet-101 backbones pretrained on the MS COCO object detection dataset. Because one FPN receives a depth image it has only one input channel and its input layer has randomly initialized weights. The encoders' output feature maps are merged by elementwise addition. The decoder is a simpler architecture that uses convolution transpose layers to upsample feature maps followed by dimension-preserving convolution layers with 3×3 filters. The output layer has linear activations and 1×1 convolutions.

Given that our model conditions on D, embodiments of Depth by Poking can be thought of as an autoencoder that attempts to denoise D using auxiliary information (RGB cues from I). If it receives only I as input, it might be thought of as a monocular depth estimation technique. Embodiments of Depth by Poking may also condition on multiple RGB inputs and act as supervision for a stereo method.

In some embodiments of the present invention, a depth map (whether generated using an embodiment of the present invention or by another method) may be used to implement what is referred to herein as a "fast approach" method, namely allowing the robot to approach objects in the bin quickly and using the depth map (e.g., the Death by Poking prediction) enable the robot to slow down as the robot arm's end effector comes into proximity with any of the objects so as not to collide with objects in the bin. Embodiments of the present invention are capable of predicting the minimum distance at which contact will be obtained, because the system was directly trained to do so.

A "slow" approach by the end effector may, for example, be a speed at which it is safe to approach an object while measuring tactile feedback and stop from the feedback measurement, i.e., a speed at which the object or robot will not be damaged when the end effector stops after making contact with the object. A "fast" approach may be any speed that is faster than the slow approach speed. As non-limiting examples, the speed of a fast approach may be at least 10%, at least 20%, at least 30%, at least 50%, at least 100%, at least 200%, or at least 400% faster than the speed of a slow approach.

In addition, the model uncertainty may also be used since it provides an estimate of Depth by Poking's error. If the prediction is highly certain, then embodiments of the present invention may control the robot to engage in a fast approach more closely to the surface of the object, whereas if the model is uncertain then the robot should slow down earlier. Using depth predictions from embodiments of the present invention has advantages over depth maps produced by structured light sensors, since embodiments of the present invention are trained directly on data from contact surfaces, they should learn to correctly estimate the contact point even for surfaces that are transparent or reflective. The uncertainty map provides a way to know how large the region is where a collision might occur, and the robot policy can be better tuned with this information.

When using the fast approach to approach an object, embodiments of the present invention may control the robot arm to first move quickly before slowing down to check for contact force. It is important that the robot not collide with an object while in the fast motion phase.

This technique may involve using the output of the depth map d, and variance map v. We define two parameters, call them α and β, and assume the robot current position is p and the position of the robot arm end effector that is predicted by embodiments of the present invention is $\hat{z}$, the robot arm end effector may be controlled to slow down when:

$$p \geq \hat{z} - \alpha - \beta * \sqrt{v}$$

The α term simply adds a fixed height above the prediction at which the robot must stop. The β term incorporates the network's uncertainty into the fast approach such that if the network predicts high variance (i.e., it's less certain about the depth) then it will slow down sooner.

Because of the central limit theorem, we can assume that the model depth prediction errors are roughly gaussian with a variance predicted by the uncertainty output of the model. Therefore, the region where the collision may occur can be represented as a gaussian centered at the position predicted by embodiments of the present invention. For setting the α and β parameters, embodiments of the present invention may use standard statistical techniques. For example, in some embodiments a should be 0 if the model has no bias however it can be set for safety reasons. Because $\sqrt{v}$ represents an estimated standard deviation of depth predictions made by embodiments of the present invention, β represents the number of standard deviations away from the mean we approach before slowing down.

Certain embodiments of the present invention will now be described in more detail. More specifically, a self-supervised depth estimation system learned by attempted grasps, or "pokes" in a physical environment will now be described. Depth-by-Poking (DbP) attempts to solve two problems. First, we would like accurate depth estimates. Second, we would like to quantify our certainty in these predictions. We describe differentiable objectives for achieving these goals in the following subsections.

Certain embodiments of techniques for performing depth estimation will now be described. We wish to minimize our loss on a pixelwise basis. Because each $\hat{z}$ estimates a continuous depth value z, minimizing mean squared error (MSE) is the most straightforward approach. The squared error for the $i^{th}$ training example is given by:

$$v_i = (\hat{z}_i - z_i)^2 \quad (1)$$

Minimizing the average of Equation (1) with respect to θ over the entire dataset would treat all grasp points equally. However, it is reasonable to assume that unsuccessful grasps have noisier depth labels than successful grasps (e.g., failure may have caused the arm to retract before reaching the grasp point). Therefore, we favor a loss that assigns different weights to samples with positive or negative labels:

$$J_Z = \frac{\lambda_+}{N_+} \sum_{i=1}^{N} y_i v_i + \frac{\lambda_-}{N_-} \sum_{i=1}^{N} (1 - y_i) v_i \quad (2)$$

Where $N_+ = \Sigma_{i=1} y_i$ and $N_- = \Sigma_{i=1}(1-y_i)$ and $\lambda_+$ and $\lambda_-$ are the weights for the successful and unsuccessful grasps respectively.

Figure 5:
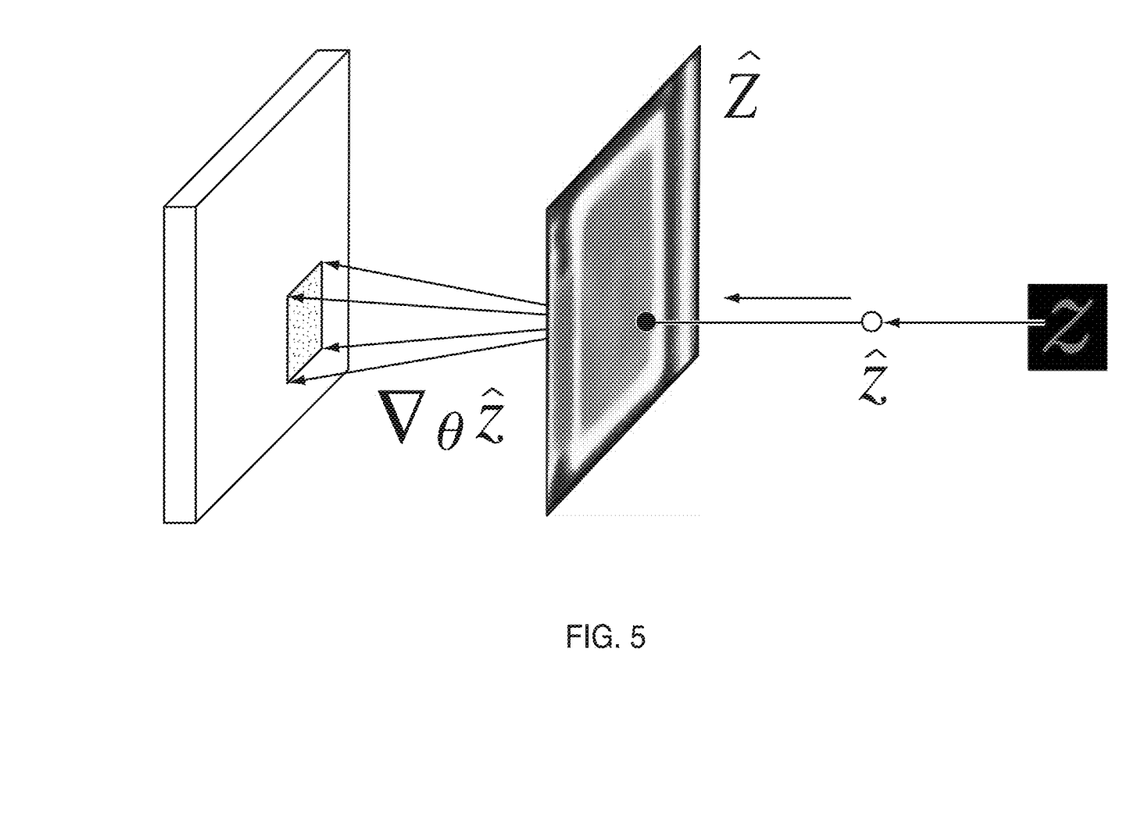
FIG. 5 illustrates learning signals propagating into larger portions of a network through an indexed activation's receptive fields according to various embodiments of the present invention.

These losses only accumulate over pixels of the output map $\hat{Z}$ for which grasp points g exist. As visualized in FIG. 5, learning signal can still propagate into larger portions of the network through the indexed activation's receptive fields.

Certain embodiments of techniques for performing uncertainty estimation will now be described. Accurate depth estimation is vital for pick and place, as embodiments of the present invention rely on depth maps to determine where the gripper should go. Underestimating the depth causes the effector to stop short of its destination, meaning the motion must be completed with slow ray tracing and tactile feedback. Overestimating the depth can cause a collision potentially damaging product or effector. In addition to estimating pixelwise depth, we therefore wish to estimate our uncertainty in our estimates to avoid unsafe actions.

Uncertainty may be divided into two broad categories: model uncertainty resulting from limited training data or aleatoric uncertainty resulting from sensor noise. In the self-supervised industrial pick and place setting we assume data are abundant. Sensor noise is however prevalent as depth sensing hardware produces poor estimates for reflective, transparent, or shiny surfaces. We therefore wish to model aleatoric uncertainty.

Modeling aleatoric uncertainty may involve minor changes to our architecture and loss function, but training and data collection otherwise remain the same. First, we add an additional output map: A variance map $\hat{V}$ with the same height and width as $\hat{Z}$, I and D. Each pixel of $\hat{V}$ stores the estimated variance, or squared error $\hat{v}$ for the corresponding depth estimate in $\hat{Z}$. In order to learn V we explore two alternative training approaches.

(1) Gaussian Log Likelihood Uncertainty Estimation. Assuming depth values z are sampled from a normal distribution with mean μ and variance ν conditioned on some input, we can estimate aleatoric uncertainty through maximum likelihood estimation.

$$J_N = \frac{1}{N} \sum_{i=1}^{N} \frac{1}{2\hat{v}_i} (z_i - \hat{z}_i)^2 + \frac{1}{2} \log \hat{v}_i \quad (3)$$

Here $\hat{z}_i$ and $\hat{v}_i$ are estimates for μ and σ at grasp pixel g. They both depend upon model inputs and parameters. Back-propagating through these estimates yields an objective that attempts to minimize MSE but can shrink loss on uncertain examples (i.e., where $\hat{v}_i$ is large).

(2) Moment Estimating Uncertainty Estimation. Alternatively, we can add an additional loss term for regressing the values of $\hat{V}$ directly. Here we make use of the fact that the average of residuals in eq:residual approximates the variance of the data. We can then use the residuals themselves as labels and minimize the objective:

$$J_V = \frac{1}{N} \sum_{i=1}^{N} (v_i |_{\nabla_\theta} - \hat{v}_i)^2 \quad (4)$$

$$= \frac{1}{N} \sum_{i=1}^{N} ((\hat{z}_i |_{\nabla_\theta} - z_i)^2 - \hat{v}_i)^2$$

Similarly to Equation (3), $\hat{v}$ denotes the value of $\hat{V}$ sampled at grasp point g. We use $\cdot|_{\nabla_\theta}$ to denote the stop gradient operation, which prevents any gradients with respect to $J_V$ from updating the parameters of the depth estimation head during training. This operation prevents large errors predicting v from affecting predictions of z during training.

One benefit of optimizing Equation (4) is that it estimates V separately from Z. We can therefore weight our loss by $\lambda_V$ depending on how much uncertainty estimation matters to a given application.

Combining Equations (2) and (4), we have the objective function:

$$J_M = J_Z + \lambda_V J_V \quad (5)$$

Minimizing Equation (5) with respect to θ then learns a model that both estimates depth and its aleatoric uncertainty on a pixelwise basis.

Figure 6:
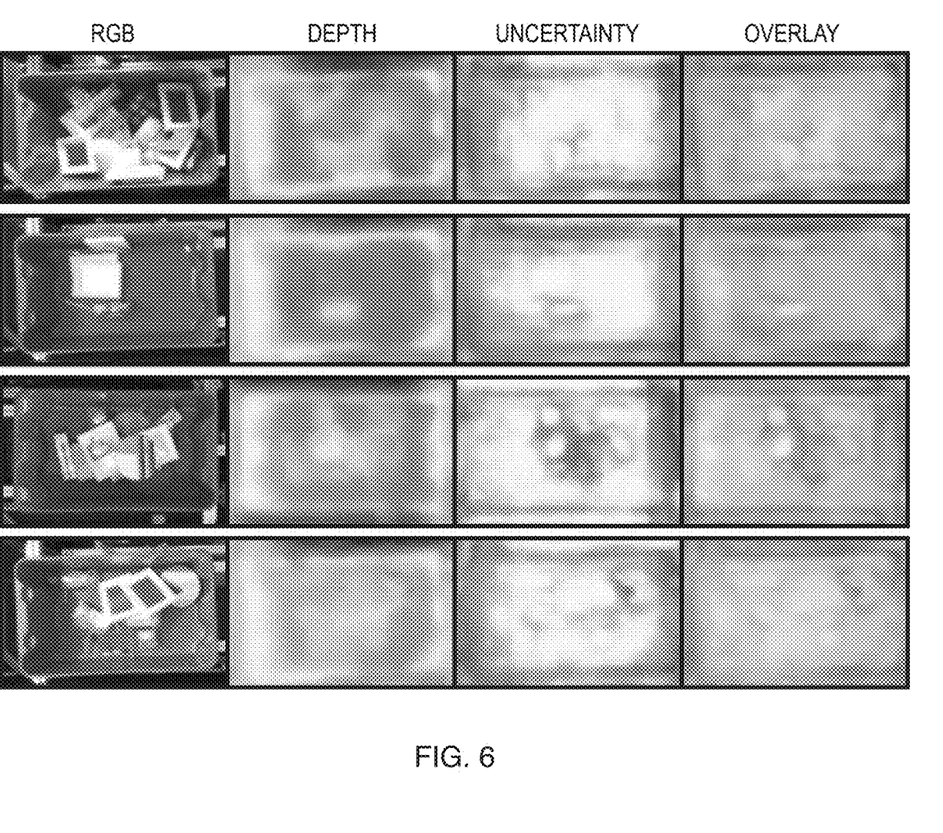
FIG. 6 illustrates of depths predicted by embodiments of the present invention on an example image.

FIG. 6 shows examples of predictions on an example image according to one embodiment of the present invention. Lighter pixels denote shorter distance to the camera in the predicted depth image Z and lower predicted variance in the uncertainty image $\hat{V}$. The final frame overlays the two previous, visualizing the relationship between depth and uncertainty. In general we see the model is more certain around pickable objects, where the data coverage is greatest.

Figure 7:
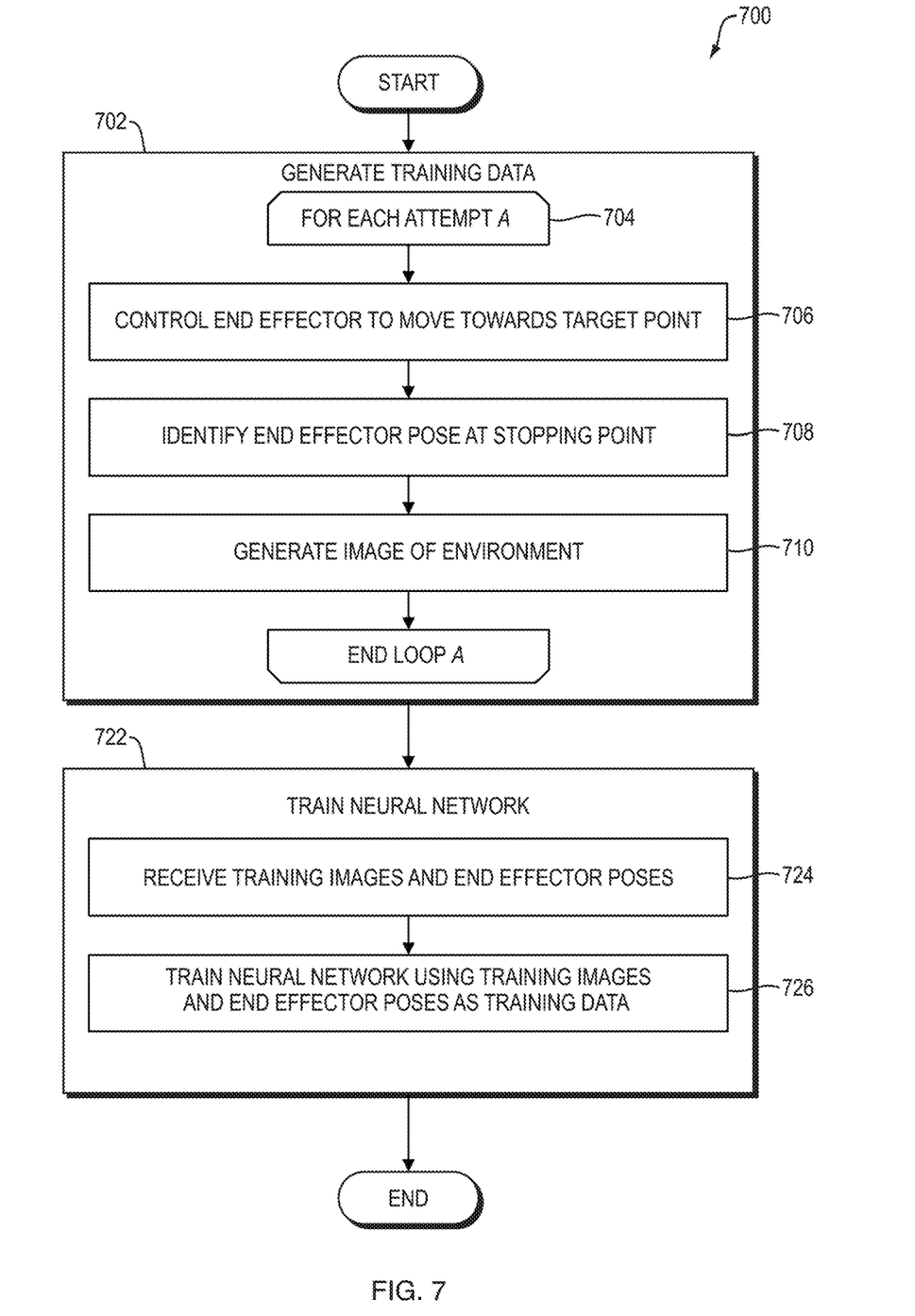
FIG. 7 is a flowchart of a method performed by various embodiments of the present invention.

Referring to FIG. 7, a flowchart is shown of a method 700 performed by one embodiment of the present invention. The method 700 may include, for example, generating training data and training a neural network using the training data. The method 700 may, however, omit generating the training data and instead use previously-generated training data. For this reason, the training portion of the method 700 will now be described first, even though the training data generation portion of the method 700 is shown first in FIG. 7.

The method 700 includes: (A) training a neural network to predict, for each of a plurality of pixels P in an input image, a depth that a robot's end effector would reach in a three-dimensional environment if the robot's end effector moved into the three-dimensional environment to target a projection of the pixel P onto the three-dimensional environment (FIG. 7, operation 722).

Training the neural network may include: (A)(1) receiving, as training data (FIG. 7, operation 724):
- a plurality of training images I, each representing the three-dimensional scene at a corresponding time when the robot's end effector is at a corresponding stopping point in the three-dimensional scene; and
- a plurality of poses of the robot's end effector, each representing a corresponding pose of the robot's end effector at a corresponding one of the stopping points.

The method 700 may: (A)(2) train the neural network using the plurality of training images I and the plurality of poses as training data, to produce a trained neural network (FIG. 7, operation 726).

Receiving the training data in (A)(1) (operation 724) may further include receiving, as training data: depth data representing, for each of the plurality of training images I, depths in the three-dimensional scene represented by the training image; and training the neural network in (A)(2) (FIG. 7, operation 726) may include training the neural network using the plurality of training images I, the depth data, and the plurality of poses as training data, to produce the trained neural network.

The depth data may, for example, include a plurality of aligned depth images D. The plurality of aligned depth images D may include, for each of the plurality of training images I, a corresponding aligned depth image representing a depth map of the three-dimensional scene represented by the training image. Training the neural network in (A)(2) (operation 726) may include training the neural network using the plurality of training images I, the plurality of aligned depth images D, and the plurality of poses as training data, to produce the trained neural network.

The depth data may be implemented in any of a variety of ways. For example, the aligned depth images D disclosed herein are examples of such depth data. Aligned depth images are not, however, a requirement of the present invention; depth data may be implemented in ways other than aligned depth images. More generally, embodiments of the present invention may receive, as training data, data which contains at least one image in which pixels may be targeted for the end effector to move toward. Embodiments of the present invention may generate depth data (e.g., a depth map) for each of some or all of the pixels in such an image in any of a variety of ways. As this implies, embodiments of the present invention need not receive input which directly represents depth data, but may instead generate sufficient depth data based on other data, such as one or more images which do not include depth data (such as two-dimensional images from which embodiments of the present invention may generate depth data).

As one particular example, embodiments of the present invention may receive as training data (e.g., operation 724) an input (e.g., RGB) image which does not contain any depth information, and also not receive any corresponding aligned depth image, in which case embodiments of the present invention may generate depth data via, for example, visual cues and context.

As another example, embodiments of the present invention may receive as training data (e.g., operation 724) a first input (e.g., RGB) image which does not contain any depth information, and also receive a second input (e.g., RGB) image. The first and second input images may have been generated using corresponding first and second cameras from different perspectives. Embodiments of the present invention may learn to perform binocular vision between the first and second input images to generate depth data (e.g., one or more aligned depth images). As yet another example, embodiments of the present invention may receive as training data (e.g., operation 724) information representing disparity between two RGB images, such as may be estimated directly using known algorithms. As yet another example, embodiments of the present invention may receive as training data (e.g., operation 724) an image that is the output of another model, or the output of some image processing algorithm.

Receiving the training data in (A)(1) (operation 724) may include receiving, as training data, a plurality of grasp successes indicating whether a plurality of attempts by the robot's end effector to grasp an object in the three-dimensional environment were successful. Training the neural network in (A)(2) (operation 726) may include training the neural network using the plurality of training images I, the depth data, the plurality of poses, and the plurality of grasp successes as training data, to produce the trained neural network.

Receiving the training data in (A)(1) (operation 724) may include receiving, as training data, a plurality of grasp successes indicating whether a plurality of attempts by the robot's end effector to grasp an object in the three-dimensional environment were successful. Training the neural network in (A)(2) (operation 726) may include training the neural network using the plurality of training images I, the plurality of poses, and the plurality of grasp successes as training data, to produce the trained neural network.

As described above, the method 700 may generate the training data before training the neural network. Examples of ways in which embodiments of the present invention may perform such training will now be described. The method 700 may further include: (B) before training the neural network (operation 722), generating the training data (FIG. 7, operation 702). Generating the training data may include, for each of a plurality of attempts A corresponding to a plurality of target points T in the input image (operation 704):
- (B)(1) controlling the robot's end effector to move into the three-dimensional environment to target a point, in the three dimensional environment, corresponding to the target point T (FIG. 7, operation 706);
- (B)(2) identifying a pose of the robot's end effector at a time when the robot's end effector has stopped moving in the three-dimensional environment (FIG. 7, operation 708); and
- (B)(3) generating a training image of the three-dimensional environment at the time when the robot's end effector has stopped moving in the three-dimensional environment (FIG. 7, operation 710).

Repeating operations 706, 708, and 710 for each of the attempts A results in generating the training data, which includes the plurality of training images I, and the plurality of poses of the robot's end effector.

Generating the training data in (B) (operation 702) may further include, within the loop over each attempt A (operation 704): (B)(4) generating an aligned depth image of the three-dimensional environment at the time when the robot's end effector has stopped moving in the three-dimensional environment. Repeating such generating of aligned depth images within the loop may generate the plurality of aligned depth images D.

Controlling the robot's end effector in (B)(1) (operation 706) may include controlling the robot's end effector to move into the three-dimensional environment to target a point, in the three dimensional environment, corresponding to the target point T, and controlling the robot's end effector to attempt to grasp an object at the point in the three-dimensional environment.

Generating the training data in (B) (operation 702) may further include, within the loop over each attempt A (operation 704): (B)(5) generating a grasp success indicating whether the attempt to grasp the object at the point in the three-dimensional environment was successful.

Controlling the robot's end effector in (B)(1) (operation 706) may include: controlling the robot's end effector to move into the three dimensional environment to target a point, corresponding to the target point T; and identifying a point, in the three dimensional environment, at which the robot's end effector makes contact with an object in the three dimensional environment.

Identifying the pose of the robot's end effector in (B)(2) (operation 708) may include identifying a pose of the robot's end effector at the time when the robot's end effector makes contact with the object in the three dimensional environment.

Controlling the robot's end effector in (B)(1) (operation 706) may include: (B)(1)(a) controlling the robot's end effector to target the point, in the three dimensional environment, corresponding to the target point T, at a first speed; (B)(1)(b) determining that the robot's end effector is within at most a minimum distance from an object in the three dimensional environment; and (B)(1)(c) in response to the determination of (B)(1)(b), controlling the robot's end effector to target the point, in the three dimensional environment, corresponding to the target point T, at a second speed, wherein the first speed is greater than the second speed.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the neural networks used by embodiments of the present invention may be applied to datasets containing millions of elements and perform up to millions of calculations per second. It would not be feasible for such algorithms to be executed manually or mentally by a human. Furthermore, it would not be possible for a human to apply the results of such learning to control a robot in real time.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
   (A) training a neural network, the training comprising:
      (A)(1) receiving, as training data:
         a plurality of training images I, each representing a three-dimensional scene at a corresponding time when a robot's end effector is at a corresponding stopping point in the three-dimensional scene; and
         a plurality of poses of an end effector of a robot, each representing a corresponding pose of the robot's end effector at a corresponding one of the stopping points; and
      (A)(2) training the neural network using the plurality of training images I, and the plurality of poses as the training data, to produce a trained neural network;
   (B) applying the trained neural network to predict, for each of a plurality of pixels P in an input image, (1) a depth that the robot's end effector would reach in a three-dimensional environment if the robot's end effector moved into the three-dimensional environment to target a projection of the pixel P onto the three-dimensional environment, and (2) an uncertainty of the depth; and
   (C) determining when to slow down the robot's end effector based on the depth and the uncertainty of the depth.

2. The method of claim 1, wherein (A)(1) further comprises receiving, as training data:
   depth data representing, for each of the plurality of training images I, depths in the three-dimensional scene represented by the training image; and
   wherein (A)(2) comprises training the neural network using the plurality of training images I, the depth data, and the plurality of poses as training data, to produce the trained neural network.

3. The method of claim 2:
   wherein the depth data comprises a plurality of aligned depth images D comprising, for each of the plurality of training images I, a corresponding aligned depth image representing a depth map of the three-dimensional scene represented by the training image; and
   wherein (A)(2) comprises training the neural network using the plurality of training images I, the plurality of aligned depth images D, and the plurality of poses as training data, to produce the trained neural network.

4. The method of claim 2:
   wherein (A)(1) further comprises receiving, as training data, a plurality of grasp successes indicating whether a plurality of attempts by the robot's end effector to grasp an object in the three-dimensional environment were successful; and
   wherein (A)(2) comprises training the neural network using the plurality of training images I, the depth data, the plurality of poses, and the plurality of grasp successes as training data, to produce the trained neural network.

5. The method of claim 1:
   wherein (A)(1) further comprises receiving, as training data, a plurality of grasp successes indicating whether a plurality of attempts by the robot's end effector to grasp an object in the three-dimensional environment were successful; and
   wherein (A)(2) comprises training the neural network using the plurality of training images I, the plurality of poses, and the plurality of grasp successes as training data, to produce the trained neural network.

6. The method of claim 3, further comprising:
   (B) before (A), generating the training data, comprising, for each of a plurality of attempts A corresponding to a plurality of target points T in the input image:
      (B)(1) controlling the robot's end effector to move into the three-dimensional environment to target a point, in the three dimensional environment, corresponding to the target point T;
      (B)(2) identifying a pose of the robot's end effector at a time when the robot's end effector has stopped moving in the three-dimensional environment; and
      (B)(3) generating a training image of the three-dimensional environment at the time when the robot's end effector has stopped moving in the three-dimensional environment;
   thereby generating the training data, the training data comprising the plurality of training images I, and the plurality of poses of the robot's end effector.

7. The method of claim 6, wherein (B) further comprises:
   (B)(4) generating an aligned depth image of the three-dimensional environment at the time when the robot's end effector has stopped moving in the three-dimensional environment; and
   thereby generating the plurality of aligned depth images D.

8. The method of claim 6, wherein (B)(1) comprises controlling the robot's end effector to move into the three-dimensional environment to target a point, in the three dimensional environment, corresponding to the target point T, and controlling the robot's end effector to attempt to grasp an object at the point in the three-dimensional environment.

9. The method of claim 8, wherein (B) further comprises:
   (B)(5) generating a grasp success indicating whether the attempt to grasp the object at the point in the three-dimensional environment was successful.

10. The method of claim 6, wherein (B)(1) comprises:
    controlling the robot's end effector to move into the three dimensional environment to target a point, corresponding to the target point T; and
    identifying a point, in the three dimensional environment, at which the robot's end effector makes contact with an object in the three dimensional environment.

11. The method of claim 10, wherein (B)(2) comprises identifying a pose of the robot's end effector at the time when the robot's end effector makes contact with the object in the three dimensional environment.

12. The method of claim 6, wherein (B)(1) comprises:
    (B)(1)(a) controlling the robot's end effector to target the point, in the three dimensional environment, corresponding to the target point T, at a first speed;
    (B)(1)(b) determining that the robot's end effector is within at most a minimum distance from an object in the three dimensional environment; and
    (B)(1)(c) in response to the determination of (B)(1)(b), controlling the robot's end effector to target the point, in the three dimensional environment, corresponding to the target point T, at a second speed, wherein the first speed is greater than the second speed.

13. A system comprising at least one non-transitory computer-readable medium having computer program instructions stored thereon, the computer program instructions being executable by at least one computer processor to perform a method, the method comprising:
(A) training a neural network, the training comprising:
  (A)(1) receiving, as training data:
    a plurality of training images I, each representing a three-dimensional scene at a corresponding time when a robot's end effector is at a corresponding stopping point in the three-dimensional scene; and
    a plurality of poses of an end effector of a robot, each representing a corresponding pose of the robot's end effector at a corresponding one of the stopping points; and
  (A)(2) training the neural network using the plurality of training images I, and the plurality of poses as the training data, to produce a trained neural network;
(B) applying the trained neural network to predict, for each of a plurality of pixels P in an input image, (1) a depth that the robot's end effector would reach in a three-dimensional environment if the robot's end effector moved into the three-dimensional environment to target a projection of the pixel P onto the three-dimensional environment, and (2) an uncertainty of the depth; and
(C) determining when to slow down the robot's end effector based on the depth and the uncertainty of the depth.

14. The system of claim 13, wherein (A)(1) further comprises receiving, as training data:
depth data representing, for each of the plurality of training images I, depths in the three-dimensional scene represented by the training image; and
wherein (A)(2) comprises training the neural network using the plurality of training images I, the depth data, and the plurality of poses as training data, to produce the trained neural network.

15. The system of claim 14:
wherein the depth data comprises a plurality of aligned depth images D comprising, for each of the plurality of training images I, a corresponding aligned depth image representing a depth map of the three-dimensional scene represented by the training image; and
wherein (A)(2) comprises training the neural network using the plurality of training images I, the plurality of aligned depth images D, and the plurality of poses as training data, to produce the trained neural network.

16. The system of claim 14:
wherein (A)(1) further comprises receiving, as training data, a plurality of grasp successes indicating whether a plurality of attempts by the robot's end effector to grasp an object in the three-dimensional environment were successful; and
wherein (A)(2) comprises training the neural network using the plurality of training images I, the depth data, the plurality of poses, and the plurality of grasp successes as training data, to produce the trained neural network.

17. The system of claim 13:
wherein (A)(1) further comprises receiving, as training data, a plurality of grasp successes indicating whether a plurality of attempts by the robot's end effector to grasp an object in the three-dimensional environment were successful; and wherein (A)(2) comprises training the neural network using the plurality of training images I, the plurality of poses, and the plurality of grasp successes as training data, to produce the trained neural network.

18. The system of claim 15, wherein the method further comprises:
(B) before (A), generating the training data, comprising, for each of a plurality of attempts A corresponding to a plurality of target points T in the input image:
  (B)(1) controlling the robot's end effector to move into the three-dimensional environment to target a point, in the three dimensional environment, corresponding to the target point T;
  (B)(2) identifying a pose of the robot's end effector at a time when the robot's end effector has stopped moving in the three-dimensional environment; and
  (B)(3) generating a training image of the three-dimensional environment at the time when the robot's end effector has stopped moving in the three-dimensional environment;
thereby generating the training data, the training data comprising the plurality of training images I, and the plurality of poses of the robot's end effector.

19. The system of claim 18, wherein (B) further comprises:
(B)(4) generating an aligned depth image of the three-dimensional environment at the time when the robot's end effector has stopped moving in the three-dimensional environment; and
thereby generating the plurality of aligned depth images D.

20. The system of claim 18, wherein (B)(1) comprises controlling the robot's end effector to move into the three-dimensional environment to target a point, in the three dimensional environment, corresponding to the target point T, and controlling the robot's end effector to attempt to grasp an object at the point in the three-dimensional environment.

21. The system of claim 20, wherein (B) further comprises:
(B)(5) generating a grasp success indicating whether the attempt to grasp the object at the point in the three-dimensional environment was successful.

22. The system of claim 18, wherein (B)(1) comprises:
controlling the robot's end effector to move into the three dimensional environment to target a point, corresponding to the target point T; and
identifying a point, in the three dimensional environment, at which the robot's end effector makes contact with an object in the three dimensional environment.

23. The system of claim 22, wherein (B)(2) comprises identifying a pose of the robot's end effector at the time when the robot's end effector makes contact with the object in the three dimensional environment.

24. The system of claim 18, wherein (B)(1) comprises:
(B)(1)(a) controlling the robot's end effector to target the point, in the three dimensional environment, corresponding to the target point T, at a first speed;
(B)(1)(b) determining that the robot's end effector is within at most a minimum distance from an object in the three dimensional environment; and
(B)(1)(c) in response to the determination of (B)(1)(b), controlling the robot's end effector to target the point, in the three dimensional environment, corresponding to the target point T, at a second speed, wherein the first speed is greater than the second speed.

* * * * *